United States Patent [19]

Shimomura et al.

[11] 4,430,929

[45] Feb. 14, 1984

[54] VENTILATION MECHANISM

[75] Inventors: Masuo Shimomura, Nagoya; Tsuneo Uchimoto, Toyota, both of Japan

[73] Assignees: Aisin Seiki Kabushiki Kaisha, Kariya; Toyota Jidosha Kogyo Kabushiki Kaisha, Toyota, both of Japan

[21] Appl. No.: 290,360

[22] Filed: Aug. 5, 1981

[30] Foreign Application Priority Data

Aug. 9, 1980 [JP] Japan .................................. 55-109581

[51] Int. Cl.³ .............................................. B60H 1/24
[52] U.S. Cl. ...................................... 98/2.18; 251/230
[58] Field of Search ........................... 98/2, 2.18, 118; 251/230

[56] References Cited

U.S. PATENT DOCUMENTS 3,012,812 12/1961 Miller, Jr. ............................. 98/2.18
3,220,695 11/1965 Downey et al. ................. 251/230 X
4,116,216 9/1978 Rosenberg ....................... 251/230 X
4,221,238 9/1980 Madsen ............................ 251/230 X Primary Examiner—Albert J. Makay
Assistant Examiner—Harold Joyce
Attorney, Agent, or Firm—Oblon, Fisher, Spivak, McClelland & Maier

[57] ABSTRACT

A ventilation mechanism to be mounted in a window opening on a front lateral side of a motor vehicle, including a bracket adapted to be fixed in the window opening, a valve member supported on the bracket and movable between two positions for opening and closing ventilation aperture or apertures in the bracket, a rotor rotable through a predetermined angle in relation with the movement of the valve member, and a control mechanism determining the position of the valve member in response to an angular rotation of the rotor. The bracket includes inner and outer plates each provided with an aperture or apertures to permit air flow therethrough. The inner plate is provided with a first cylinder portion to support therein a second cylinder portion the vale member non-rotatably and axially displaceable. The rotor is rotatably supported on the outer plate of the bracket in the form of a cylinder loosely fitting in the second cylinder portion of the valve member. The control mechanism includes a plurality of sawtooth-like cam grooves extending around the outer periphery of the rotor and pawl projections projecting from the second cylinder portion of the valve member and engageable with the cam grooves, the control mechanism stopping and maintaining the valve member either in a first position which blocks the aperture in the inner plate of the bracket or in a second position which uncovers the aperture to permit air flow therethrough.

8 Claims, 4 Drawing Figures

VENTILATION MECHANISM

BACKGROUND OF THE INVENTION

1. Field of the Invention

This invention relates to a ventilation mechanism, and more particularly to a vehicular ventilation mechanism for ventilating the passenger space of a vehicle.

2. Description of the Prior Art

In order to ventilate the passenger space of a motor vehicle, it has been the general practice to actuate a fan from the passenger space or to open or close a window pane during driving operation. In this connection, it is known that a relatively high vacuum occurs around the marginal portions of the front door window pane when the vehicle is traveling and especially the vacuum is strongest in the lower corner portion of the front door window.

SUMMARY OF THE INVENTION

In consideration of the fact that, as mentioned above, a high vacuum is produced in the lower corner portion of the front door window pane of a motor vehicle, the present invention has as its object the provision of a ventilating mechanism of a novel and simple construction which is intended to be mounted in such a corner portion for ventilating the passenger space of the vehicle.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts through the several views and wherein.

DETAILED DESCRIPTION OF THE PREFERRED EMBODIMENT

One preferred embodiment of the present invention is hereafter described with reference to the accompanying drawings.

Figure 1:
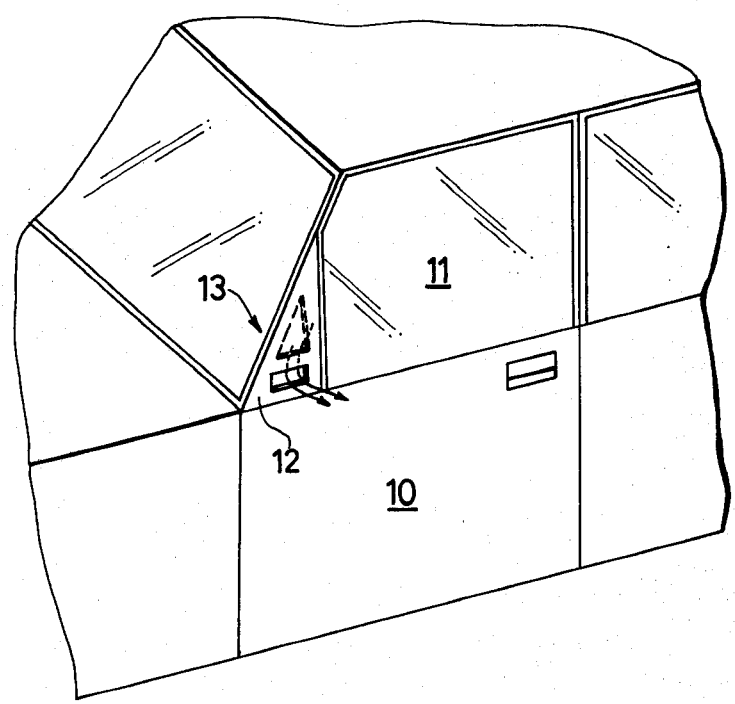
FIG. 1 is a diagrammatic perspective view of the ventilation mechanism of the invention as mounted on a motor vehicle.
Figure 2:
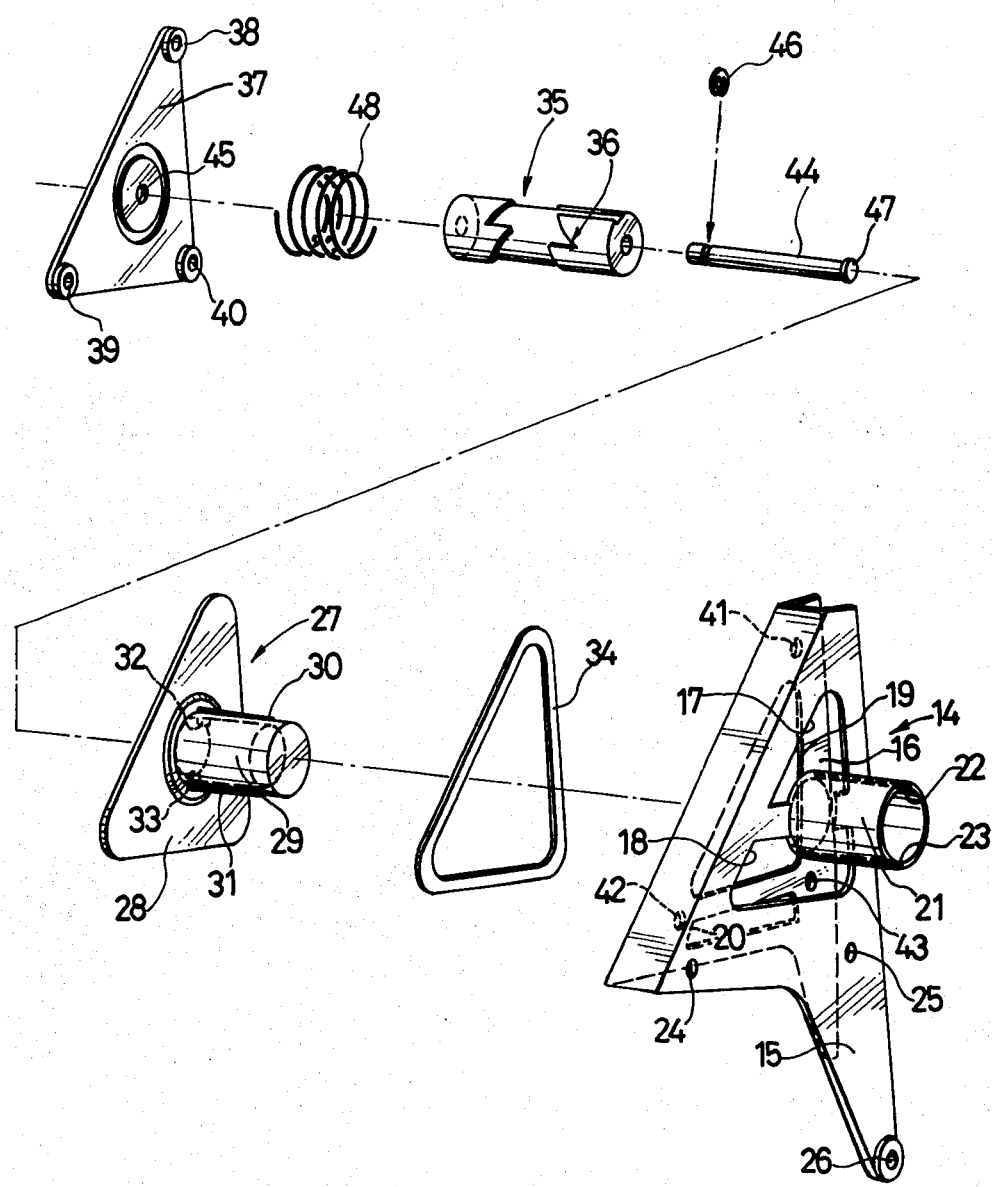
FIG. 2 is an exploded view of the ventilation mechanism according to the invention.
Figure 3:
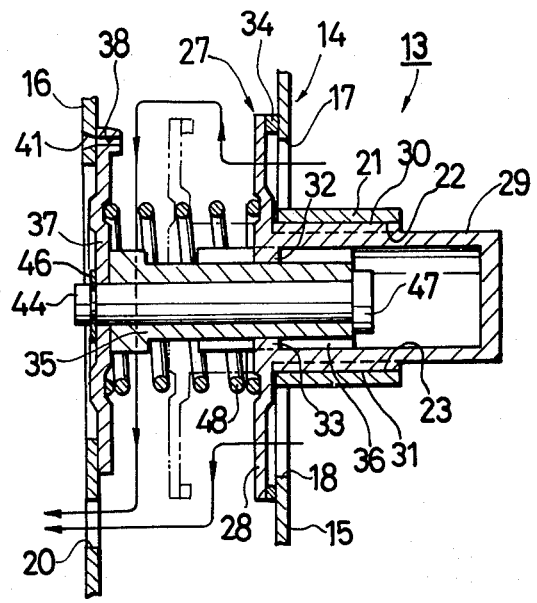
FIG. 3 is a sectional view of the ventilation mechanism of FIG. 2.

Referring to FIG. 1, indicated by reference number 10 is a front door of a motor vehicle and by 11 a window opening to be opened or closed by a window pane. As generally indicated by reference number 13, a ventilation mechanism according to the present invention is provided in the lower corner portion 12 of opening 11. Ventilation mechanism 13 includes a bracket 14, a valve member 27, a spring 48 and a rotor 35 as shown in FIGS. 2 and 3.

Bracket 14 includes an inner plate 15 and an outer plate 16. Apertures 17 and 18 which are provided in inner plate 15 open into the passenger space, while apertures 19 and 20 provided in outer plate 16 open to the outside, permitting the passenger space to communicate with the outside therethrough. A hollow cylinder member 21 fixed substantially at the center of inner plate 15 of bracket 14 extends inwardly into the passenger space. Cylinder member 21 is open at its axial opposite ends and provided with axial slits 22 and 23 on the inner peripheral wall thereof. Bracket 14 is fixed to the inner panel of the door by suitable fixing members through three mounting holes 24, 25 and 26.

Valve member 27 is provided with a flat plate-like base portion 28 and a cylinder portion 29 which is extended from base 28 on the side of passenger space and which is fittingly engageable in cylinder member 21. Cylinder portion 29 is closed at its inner end on the side of the passenger space and open at its outer end. Cylinder portion 29 of valve member 27 is provided with axial ribs 30 and 31 on the outer periphery thereof for threaded engagement with slits 22 and 23 of cylinder member 21 of bracket 14, respectively. On the inner peripheral wall of the open end of cylinder portion 29, valve member 27 is provided with a pair of pawl projections 32 and 33. Designated by reference number 34 is a seal member which is secured along the marginal edges of valve member 27 and abuttingly engageable with the inner plate of bracket 14 to block air communication between the passenger space and the outside.

Rotatable hollow rotor 35 is provided with a plurality of cam grooves on its outer periphery, as generally indicated by reference number 36, which are engageable with pawl projections 32 and 33 on the inner periphery thereof and at the open end of cylinder portion 29 of valve member 27. A cover plate 37 with three holes 38, 39 and 40 is fixed to bracket 14 by suitable fixing members (not shown) which are engageable with three holes 38 to 40 and holes 41 to 43 in the outer plate of bracket 14.

Designated by reference number 44 is a pin which is passed through the internal bore of rotor 35 and a hole 45 in cover plate 37 has one end thereof secured to cover plate 37 by an E-ring 46, supporting rotor 35 rotatably thereon. The other end of pin 44 is provided with a flange 47 to prevent dislocation of the rotor 35 from the pin 44. Spring 48 has its opposite ends engaged against cover plate 37 and valve member 37, biasing valve member 27 toward inner plate 15 of bracket 14. Therefore, if cylinder portion 29 of valve member 27 is depressed or moved to the left in FIG. 3 against the action of spring 48, pawl projections 32 and 33 of valve member 27 are also moved to the left and brought into engagement with the plurality of cam grooves 36 of rotor 35. Accordingly, rotor 35 is rotated through a predetermined angle and displaced in an axial direction to ventilate passenger space 18 of the vehicle through apertures 17 and 18 of inner plate 15 and apertures 19 and 20 of outer plate 16 of bracket 14 in a manner as will be described hereinafter.

Figure 4:
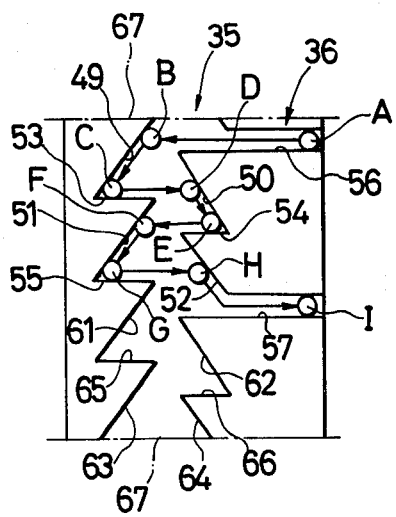
FIG. 4 is a diagrammatic view explanatory of the operation.

FIG. 4 illustrates rotor 35 in development. as seen therefrom, each of cam grooves 36 is provided with a first sloped surface 49, a second sloped surface 50, a third sloped surface 51 and a fourth sloped surface 52. At the respective lower end of first to third sloped surfaces 49 and 51, there is provided a first stepped surface 53, a second stepped surface 54 and a third stepped surface 55, respectively. Reference numerals 56 and 57 indicate first and second longitudinal grooves, respectively.

First and third sloped surfaces 49 and 51 constitute surfaces which are inclined in the same direction relative to a line perpendicularly intersecting the longitudinal axis of rotor 35, while second and fourth sloped surfaces 50 and 52 constitute surfaces which are inclined in the direction inverse to first and third sloped surfaces 49 and 51.

First, second and third stepped surfaces 53, 54 and 55 form cam grooves which extend parallel with the longitudinal axis of rotor 35, first stepped surface 53 interconnecting the lower end of first sloped surface 49 and the upper end of third sloped surface 51 while second stepped surface 54 interconnects the lower end of second sloped surface 50 and the upper end of fourth sloped surface 52. Third stepped surface 55 is interconnected to the upper end of a fifth sloped surface 61 which will be described hereinafter, and the lower end of fourth sloped surface 52 is connected to second longitudinal groove 57. The upper end of second sloped surface 50 is connected to first longitudinal groove 56.

Fifth and seventh sloped surfaces 61 and 63 which are inclined in the same direction as first and third sloped surfaces 49 and 51 are interconnected by a fourth stepped surface 65 similar to third stepped surface 55, seventh sloped surface 63 being connected to first sloped surface 49 by a similar sixth stepped surface 67 to form a series of sawtooth cam grooves around the circumference of rotor 35.

On the other hand, sixth sloped surface 62 which is inclined in the same direction as second sloped surface 50 has its upper end connected to second longitudinal groove 57 and its lower end connected to the upper end of eighth sloped surface 64 which is inclined in the same direction as fourth sloped surface 52 by a fifth stepped surface 66 similar to second stepped surface 54. The lower end of eighth sloped surface 64 is connected to first longitudinal groove 56 to form a bisected series of sawtooth cam grooves around the circumference of rotor 35.

When the cam groove section containing second and fourth sloped surface 50 and 52 is in engagement with pawl projection 32, and other cam groove section containing sixth and eighth sloped surfaces 62 and 64 is in engagement with pawl projection 33. The following description explains the operation by way of engagement of pawl projection 32 with the cam groove section containing second and fourth sloped surfaces 50 and 52, but it is to be understood that pawl projection 32 is similarly engaged with the other cam groove section containing sixth and eight sloped surfaces 62 and 64 and that other pawl projection 33 is engageable with the two cam groove sections in the same manner.

Operation of the present invention is as follows. In order to open ventilation mechanism 13 for the ventilation of passenger space 18, a vehicle occupant depresses cylinder portion 29 of valve member 27 to the left in FIG. 3 whereupon pawl projection 32 of valve member 27 which is in first longitudinal groove 56 of rotor 35 in FIG. 4 slides from position A to position B against the biasing force of spring 48. Pawl projection 32 of valve member 27 slidingly moved to position B slides along first sloped surface 49 of rotor 35 until it engages with first stepped surface 53 at position C. As a result of this sliding movement, rotor 35 is rotated a corresponding angle. At this time, if the depressing force is removed from cylinder portion 29 of valve member 27, pawl projection 32 of valve member 27 slides to position D on second sloped surface 50 by the biasing force of spring 49 without accompanying angular rotation of rotor 35, and further along the second sloped surface of rotor 35 until the pawl projection stops at position E, thereby causing angular rotation of rotor 35 in the same direction. Upon pawl projection 32 of valve member 27 engaging second stepped surface 54, rotor 35 stops and maintains valve member 27 in a position which is displaced from the original position by a predetermined distance in axial direction, holding ventilation mechanism 13 in an open state. Therefore, due to the existence of a strong vacuum as mentioned hereinbefore, air in the passenger space is released to the outside through apertures 17 and 18 of inner plate 15 and apertures 19 and 20 of outer plate 16 of bracket 14.

In order to restore the closed state of ventilation mechanism 13 from the above-described open state, cylinder portion 29 of valve member 27 is depressed to the left in FIG. 3, whereupon pawl projection 32 of valve member 27 which has been in engagement with the second stepped surface 54 of rotor 35 slides from position E to position in F in FIG. 4 against the biasing force of spring 48. Upon reaching position F, pawl projection 32 of valve member 27 slides along third sloped surface 51 on rotor 35 until the pawl projection stops at position G on third stepped surface 55, causing rotor 35 to rotate a corresponding angle. At this time, upon removal of the depressing force from cylinder portion 29 of valve member 27, pawl projection 32 of valve member 27 slides to position H on fourth sloped surface 52 by the biasing force of spring 48 without accompanying angular rotation of rotor 35. Pawl projection 32 is then slid along fourth sloped surface 52 of rotor 35 until it is trapped in second longitudinal groove 57, causing rotor 35 to rotate again by a corresponding angle in the same direction and returning valve member 27 to the initial position to close ventilation mechanism 13. Thus, the passenger space, of the vehicle is sealed from the outside by base portion 28 of valve member 27 which blocks communication between apertures 17 and 18 of inner plate 15 and apertures 19 and 20 of the outer plate of bracket 14, stopping ventilation of the passenger space. The above-described opening and closing operations of ventilation mechanism 13 proceed continuously.

As described hereinbefore, the ventilation mechanism of the invention which is mounted in a lower corner portion of a window pane in the front portion of a motor vehicle is capable of positively ventilating the passenger space of the vehicle by a simple ventilation mechanism using a novel combination of a valve member and a rotor. Although the valve member is provided with pawl projections and the rotor is provided with a plurality of cam grooves for engagement with the pawl projections of the valve member in the above-described embodiment, similar effects can be obtained by an arrangement with a plurality of cam grooves on the valve member and pawl projections on the rotor for engagement with the cam grooves on the valve member.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A ventilation mechanism mounted in an opening on a front lateral side of a vehicle body, comprising:
a non-rotatable valve member located in the opening and axially movable between two positions for permitting or blocking air flow through said opening, said opening and said valve are non-circular in shape so as to be positioned at a lowermost front corner of a front door window of said vehicle;

a rotor supported in said opening, said rotor being rotatably mounted relative to the vehicle body and adapted to undergo controlled angular rotation in relation to movement of said valve member; and control means comprising a plurality of cam grooves formed in one of said valve member and said rotor and at least one pawl projection provided on the other of said valve member and said rotor for engagement with said cam grooves, whereby said rotor rotates through a predetermined angle by engagement of said at least one pawl projection with said cam grooves due to movement of said valve member, and said valve member is held in a ventilating open position or a closed non-ventilating position according to the position of said pawl projection in said cam grooves.

2. A ventilation mechanism as set forth in claim 1, further comprising:

a first cylinder portion mounted in said opening on the inner side of the vehicle body, and wherein said valve member further comprises a second cylinder portion non-rotatably and axially slidably mounted in said first cylinder portion, said rotor being loosely fitted in said second cylinder portion, and said pawl projection and cam grooves of said control means are disposed on opposed portions of said second cylinder portion of said valve member and said rotor.

3. A ventilation mechanism as set forth in claim 1 or 2, further comprising at least one spring for biasing said valve member in a direction blocking ventilation.

4. A ventilation mechanism as set forth in claim 1, futher comprising:

a bracket fixedly mounted in said opening of the vehicle body and comprising a pair of opposingly spaced plates, said bracket having apertures formed in each of said plates to permit passage therethrough of air flow between the passenger space of the vehicle and outside thereof;

said valve member being movably mounted relative to a first plate of said pair of plates of said bracket for opening and closing the apertures in said plates; and a second plate of said pair of plates rotatably supporting said rotor means.

5. A ventilation mechanism as set forth in claim 4, wherein said bracket further comprises a first cylinder portion on said first plate of said pair of plates, and wherein said valve member further comprises a second cylinder portion axially slidably and non-rotatably fitted in said first cylinder portion, said rotor being loosely fitted in said second cylinder portion, and said pawl projection and cam grooves of said control means are disposed on opposed portions of said rotor and the second cylinder portion of said valve member 6. A ventilation mechanism as set forth in claim 4 or 5, further comprising at least one spring interposed between said valve member and the second plate of said pair of plates for biasing said valve member toward said first plate for blocking air flow through said apertures.

7. A ventilation mechanism as set forth in claim 4 or 5, wherein said valve member further comprises a flat plate-like base portion secured to one end portion of said second cylinder portion for closing the ventilating aperture in the first plate of said pair of plates of said brackets.

8. A ventilation mechanism mounted in an opening on a front lateral side of a vehicle body, comprising:

a bracket mounted in said opening and which comprises a pair of spacedly opposing plates each with at least one aperture formed therein to permit passage therethrough of air flow between the passenger space of the vehicle and outside thereof;

a first cylinder portion provided on a first plate of said pair of plates of said bracket located on the side of said passenger space;

a valve member having a second cylinder portion fitted in said first cylinder portion of said first plate and a base portion of a shape suitable for closing the aperture in said first plate to block air flow;

guide means including a groove longitudinally formed in one of said first and second cylinder portions and a rib fitted in said groove and formed in the other of said first and second cylinder portions, whereby said valve member can move longitudinally, but not rotatably, relative to said bracket;

a rotor rotatably supported on the second plate of said bracket and loosely fitted in said second cylinder portion of said valve member;

a spring interposed between said second plate of said bracket and said valve member for biasing said valve member toward said first plate; and control means comprising a plurality of sawtooth cam grooves formed in one of the circumference of said rotor and the inner periphery of the second cylinder portion of said valve member and at least one pawl projection mounted on the other of the rotor and second cylinder portion for engagement with said cam grooves;

said base portion of said valve member being fixably movably mounted between a closed position in which said aperture in said first plate of said bracket is closed by said base portion and a ventilating position in which said aperture is opened, by the engagement of said cam grooves and said pair of projections resulting from movement of said valve member relative to said bracket and that the valve member is fixably moved to a position closing the aperture in the first plate of said pair of plates of the bracket by the base portion of the valve member and to a position opening the aperture to permit air flow through the aperture by displacement of the base portion through engagement of the cam grooves and pawl projection upon the movement of the valve member relative to the bracket in the axial direction of the second cylinder portion.

* * * * *